Nov. 20, 1956

D. LIBERMANN ET AL
NEW DERIVATIVES OF DESOXYBENZOINS
AND THE PROCESS OF PREPARING THEM 2,771,393

Filed July 27, 1953

2 Sheets-Sheet 1

DAVID LIBERMANN
MAURICE MOYEUX
INVENTORS

By Richardson, David and Kahn
Their ATTYS.

Nov. 20, 1956         D. LIBERMANN ET AL         2,771,393
           NEW DERIVATIVES OF DESOXYBENZOINS
              AND THE PROCESS OF PREPARING THEM
Filed July 27, 1953                    2 Sheets-Sheet 2

DAVID LIBERMANN
MAURICE MOYEUX
    INVENTORS
By Richardson, David and Nordon
      their ATTYS.

United States Patent Office 2,771,393
Patented Nov. 20, 1956

2,771,393

NEW DERIVATIVES OF DESOXYBENZOINS AND THE PROCESS OF PREPARING THEM

David Libermann and Maurice Moyeux, Paris, France, assignors to Chimie et Atomistique, Paris, France, a French body corporate Application July 27, 1953, Serial No. 370,518

12 Claims. (Cl. 167—65)

The present invention relates to new derivatives of desoxybenzoins and in particular of hydroxy-desoxybenzoins and the process of preparing them.

Figure 1:
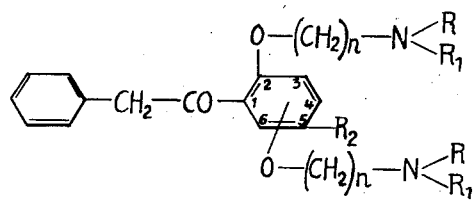

The new compounds forming the object of the invention are those having the general formula represented by Fig. 1 in the accompanying drawing and the salts thereof; in this formula, $R_2$ is hydrogen, an alkyl or aralkyl radical, R and $R_1$ are lower alkyl radicals, $n$ is a whole integer comprised between 1 and 3, and the second substituent

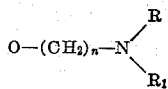

is in position 6 or 4.

Among these compounds, preference is given to those in which R and $R_1$ are identical and represent a lower alkyl radical of 1 to 4 carbon atoms, $n$ is equal to 2 or 3, and $R_2$ is hydrogen or an alkyl radical.

It has been discovered that these new compounds combine with a very slight toxicity great antiseptic, bactericide and anthelmintic activity. Owing to these properties, these compounds are of particular use in foodstuff industries and in human and veterinary medicine.

Figure 2:
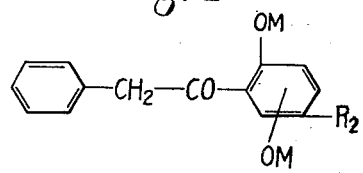

The invention has for further object to provide a process of preparing the aforementioned new compounds which comprises reacting with an alkaline derivative of a hydroxy-desoxybenzoin of the formula represented in Fig. 2, in which M represents an alkaline metal and $R_2$ has the aforementioned signification, the second group OM being in position 4 or 6, a tertiary halogenated base of formula

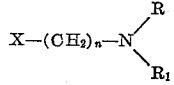

in which X represents a halogen and $n$, R and $R_1$ have the aforementioned significations.

Figure 3:
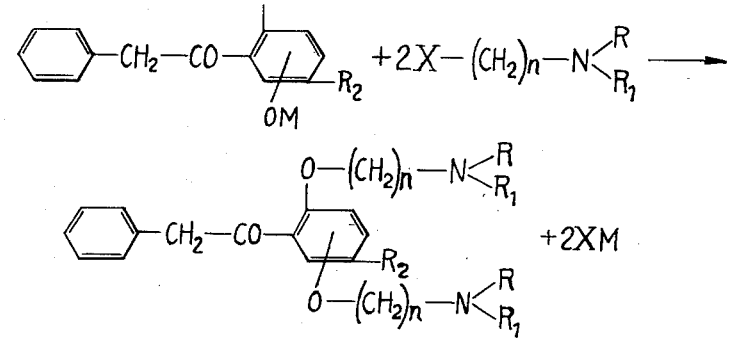

The reaction occurs according to the equation represented in Fig. 3.

Sodium derivatives of hydroxy-desoxybenzoins are preferably utilized, and the reaction is effected by heating in a water bath, the reactants being dissolved in a suitable solvent such as alcohol.

When the reaction is completed, the reactional mixture is acidified for purposes of forming amine salts, and the solvent is evaporated.

The free amine may be obtained by alkalization or the compound may be employed in the form of a salt.

By way of non-limitative illustration, some examples of preparing the compounds according to the invention will now be given.

EXAMPLE 1

Figure 4:
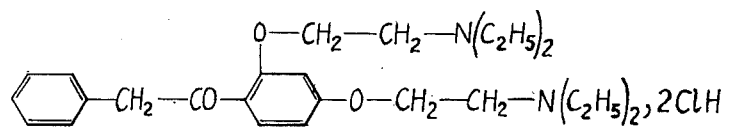

*2.4-bis-diethylaminoethoxydesoxybenzoin-dihydrochloride (Fig. 4)*

1.8 gr. of sodium are dissolved in 40 cc. of absolute alcohol. To the solution are added 8.85 gr. of 2.4-dihydroxydesoxybenzoin which readily dissolve. 10.5 gr. of diethylaminochloroethane are then added. The deposit of sodium chloride immediately commences. The mixture is heated for 2 hours in a water bath.

The sodium chloride is drained, the filtrate is cooled in ice and hydrochloric acid ether solution is added until Congo red acidity. The mixture is filtered if necessary, the solvents are distilled off in a vacuum and the mixture is desiccated. The product subsequently solidifies. It is employed in an aqueous solution since it is highly hygroscopic.

The characteristics of the compound are as follow:
The alkalies liberate the base insoluble in water which proves the complete blockage of the original phenolic functions. The dihydrochloride is highly soluble in water, soluble in alcohol, and insoluble in ether, benzene, chloroform and petrol ether.

EXAMPLE 2

Figure 5:
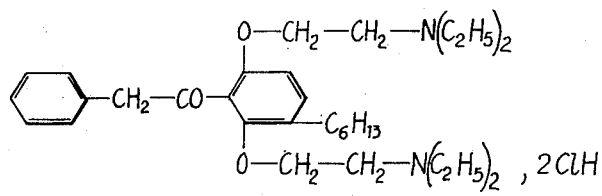

*2.6-bis-diethylaminoethoxy-5-hexyl-desoxybenzoin-dihydrochloride (Fig. 5)*

The product is prepared by means of an identical procedure. To 1.8 gr. of sodium in 40 cc. of absolute alcohol are added 12.2 gr. of 2.6-dihydroxy-5-hexyldesoxybenzoin and 10.5 gr. of diethylamino-chloroethane. The mixture is then heated for 2–3 hours in a water bath, the end of the reaction being determined by taking a filtered sample, heating it, and verifying that no more sodium chloride is deposited. The mixture is drained and the cooled filtrate is acidified by hydrochloric acid ether solution; the solvents are then evaporated in a vacuum.

The characteristics of the compound are as follow:
The alkaline bases liberate the free amine which is insoluble in water, which proves the complete blockage of the two original phenolic functions. The dihydrochloride is highly soluble in water, soluble in alcohol, and is insoluble in ether, benzene, chloroform and petrol ether.

EXAMPLE 3

Figure 6:
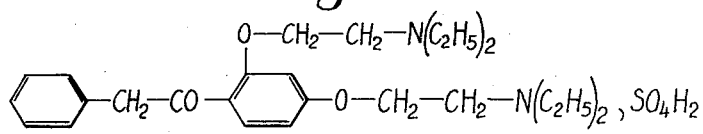

*2.4-bis-diethylaminoethoxydesoxybenzoin sulfate (Fig. 6)*

27.6 gr. of sodium are dissolved in 550 cc. of absolute alcohol. The mixture is cooled at room temperature and then there are added, by fractions, 137 gr. of 2.4-dihydroxydesoxybenzoin which readily dissolve upon stirring by hand. Thereafter, 162 gr. of diethylaminochloroethane are added in one go and the mixture is heated in a water bath. As soon as the formation of sodium chloride commences the mixture is removed from the water bath. The reaction follows with liberation of heat. The mixture is left to stand for 2 hours. The sodium chloride formed is drained and is washed with absolute alcohol. The alcohol of the filtrate is distilled off in the water bath under a water pump vacuum and thereafter under a high vacuum (the distillation flask being immersed in boiling water until the weight is constant). In this way 222 gr. of free amine are obtained.

These 222 gr. are dissolved in 550 cc. of absolute alcohol. This solution is poured into a three necked distillation flask having a stirrer, and is cooled to —10° with a mixture of ice and salt. Furthermore, 250 cc. of absolute alcohol are cooled to —10°. While stirring there is slowly added, drop by drop, 51 gr. of pure sulphuric acid (66° Bé). The temperature rises but is not allowed to exceed —5°. This alcoholic solution of sulphuric acid is maintained cold and is added to the cold alcoholic solution of the free amine, while stirring. The temperature is not allowed to exceed —5° during the addition. In this way 273 gr. of sulfate in 800 cc. of absolute alcohol are obtained. For purposes of isolating the sulfate the alcohol is evaporated in a vacuum.

This product has been found to be a powerful and well tolerated parasiticide and its employment in human and veterinary medicine constitutes a notable advance.

EXAMPLE 4

Figure 7:
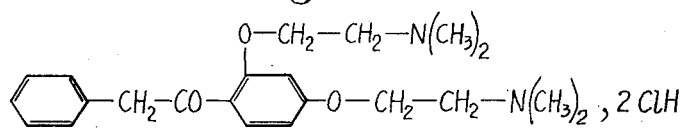

2.4-bis-dimethylaminoethoxy-desoxybenzoin-dihydrochloride (Fig. 7)

4.6 gr. of metallic sodium are reacted with 100 cc. of absolute alcohol. Thereafter, 22.8 gr. of 2.4-dihydroxy-desoxybenzoin (M. P. 116–117° C.) are gradually added while stirring by hand. The product dissolves rapidly. Then 21.5 gr. of dimethylaminochloroethane (B. P. 107–108° C.) are added in one go. The mixture is heated in a water bath until the sodium chloride commences to separate. The heating is discontinued but the alcohol continues to boil for the reaction is highly exothermic. The mixture is left to stand overnight.

The sodium chloride is drained off, washed with alcohol and oven dried, 11.6 gr. of ClNa (theoretical amount: 11.7 gr.) are thereby obtained. After draining off the ClNa, the alcohol of the filtrate obtained is distilled off in a vacuum by terminating the process in a boiling water bath. In this way the free amine is obtained in the form of a dark mass which is almost solid and is absolutely insoluble in even hot ether.

To prepare the dihydrochloride, the free amine is redissolved in alcohol and hydrochloric acid ether solution is added in excess. The solvents are distilled off in a vacuum by heating towards the end of the distillation in a boiling water bath. There is thereby obtained a solid, friable, but hygroscopic body.

ClH analysis.—Found: 15.97%; calculated: 16.47%.

EXAMPLE 5

Figure 8:
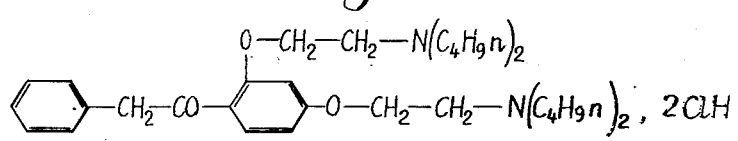

2.4-bis-dibutylaminoethoxy-desoxybenzoin-dihydrochloride (Fig. 8)

2.3 gr. of metallic sodium are dissolved in 50 cc. of absolute alcohol, 11.4 gr. of 2.4-dihydroxy-desoxybenzoin are gradually added while stirring by hand to the alcoholate obtained, thereafter 19.2 gr. of dibutylaminochloroethane (B. P. 114.116°/25 mm.) are added. The mixture is heated in a water bath until the ClNa starts to separate and is left to stand overnight. After draining and washing with absolute alcohol, 5.8 gr. of ClNa are collected (theoretical amount: 5.8 gr.). The alcohol of the filtrate is distilled off and the free amine is obtained, which is in the form of a rather fluid, coloured oil.

The free amine is transformed into hydrochloride by adding hydrochloric acid ether solution to the alcoholic solution. The hydrochloride is highly hygroscopic.

ClH analysis.—Found: 12.07; calculated: 11.94%.

EXAMPLE 6

Figure 9:
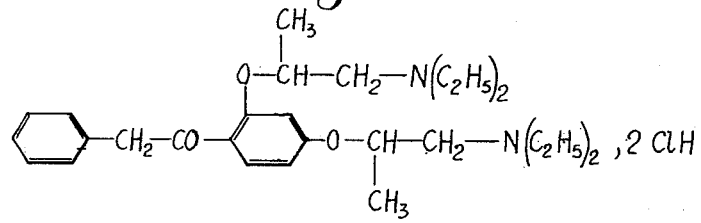

2.4-bis-β-diethylaminoisopropoxy-desoxybenzoin-dihydrochloride (Fig. 9)

4.6 gr. of metallic sodium are added to 100 cc. of absolute alcohol. The mixture is cooled and 22.8 gr. of 2.4-dihydroxy-desoxybenzoin are gradually added while stirring by hand, thereafter 30 gr. of diethylamino-1, chloro- 2 propane are added in one go. The mixture is heated in a water bath for about 1 hour. Sodium chloride separates. The mixture is left to stand several hours, the sodium chloride is drained and washed with absolute alcohol. The alcohol of the filtrate is then distilled off in a vacuum. The free amine obtained weighs 40 gr. The free amine is treated with 400 cc. of ether. The insoluble matter (about 12 gr.) is separated and a slight excess of hydrochloric acid ether solution is added to the ether solution. The hydrochloride precipitates and is washed with ether and then dried until a constant weight is attained. The product is hygroscopic.

Analysis.—Found ClH: 14.35%; calculated ClH: 13.87%.

As has been hereinbefore stated, the new compounds according to the invention have especially a high anthelmintic activity which in particular renders them extremely useful in human therapy.

To this end, these compounds may be administered either by mouth in the form of sugared pills or tablets containing in addition to the normal excipient, 10 cg., for example, of the active constituent, or by injection in the form of aqueous solutions or oily suspensions.

By way of example, there will now be given the results obtained by the anthelmintic treatment realized with 2.4-bis-diethylaminoethoxy-desoxybenzoin sulfate (Example 3) in the form of sugared pills containing 10 cg. of active constituent.

Toxicity.—Nil.

Posology.—The treatment comprises:
1. A period of eight days during which 4 pills are administered per day.
2. A delay of eight days.
3. A second course of eight days of 4 pills per day.

Results obtained.—There were treated:

(a) A hundred or so cases of intestinal parasitosis caused by the following parasites: ascaris, ankylostomae, trichocephali, anguillulae, or amibae.

The results have been extremely convincing.

(b) Thirty-three cases of schistosomiasis or urinary bilharziosis (a very common illness in tropical countries and for which there is at the present time practically no treatment).

When the treatment was carried out as hereinbefore indicated, in twenty-two cases the eggs completely disappeared from the urine; in six cases tests showed only one egg for one microscopic preparation. In the other five cases there were a few rare eggs.

For all patients, the urine was clear and no longer contained blood. Another examination carried out three weeks after the first gave identical results, thereby confirming a complete cure.

The invention is not limited to the modes of carrying out the invention hereinbefore described, which have been given merely by way of example, but is intended to cover all variations and modifications thereof falling within the scope of the appended claims.

Having now described our invention what we claim as new and desire to secure by Letters Patent is:

1. New derivatives of desoxybenzoins selected from the group consisting of the compounds having the general formula:

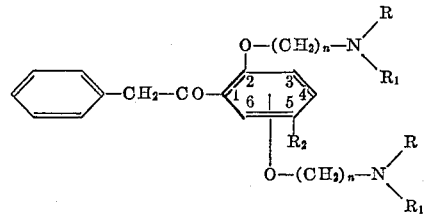

and the acid addition salts thereof, in which formula $R_2$ is a radical selected from the group consisting of hydrogen and alkyl radicals of from 1 to 6 carbon atoms, R and $R_1$ are each a lower alkyl radical of from 1 to 4 carbon atoms, $n$ is a whole integer of from 1 to 3, and the second substituent

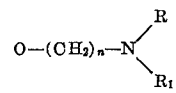

is in a position selected from the positions consisting of 4 and 6.

2. 2.4-bis-diethylaminoethoxydesoxybenzoin.

3. 2.4 - bis-diethylaminoethoxydesoxybenzoin dihydrochloride.

4. 2.4 - bis-dimethylaminoethoxydesoxybenzoin dihydrochloride.

5. 2.4 - bis-β-diethylaminoisopropoxydesoxybenzoin dihydrochloride.

6. 2.4 - bis-diethylaminoethoxydesoxybenzoin sulfate.

7. A new anthelmintic product consisting of (A) a derivative of desoxybenzoins selected from the group consisting of the compounds having the general formula:

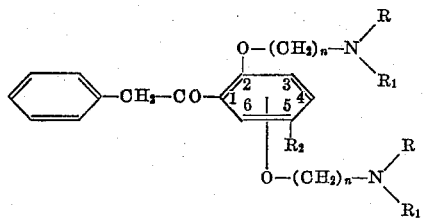

and the acid addition salts thereof, in which formula $R_2$ is a radical selected from the group consisting of hydrogen and alkyl radicals of from 1 to 6 carbon atoms R and $R_1$ are each a lower alkyl radical of from 1 to 4 carbon atoms, $n$ is a whole integer of from 1 to 3, and the second substituent

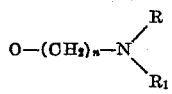

is in a position selected from the positions consisting of 4 and 6, and (B) an inert vehicle for said derivative, suitable for administration in human therapeutics.

8. Process of preparing new derivatives of desoxybenzoins selected from the group consisting of the compounds having the general formula:

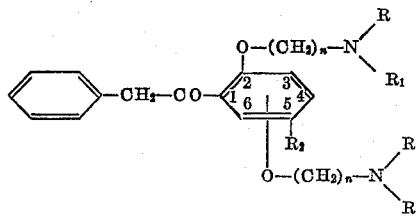

and the acid addition salts thereof, in which formula $R_2$ is a radical selected from the group consisting of hydrogen and alkyl radicals of from 1 to 6 carbon atoms, R and $R_1$ are each a lower alkyl radical of from 1 to 4 carbon atoms, $n$ is a whole integer of from 1 to 3, and the second substituent

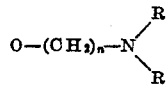

is in a position selected from the positions consisting of 4 and 6, said process comprising condensing with an alkaline derivative of a hydroxy-desoxybenzoin of the formula:

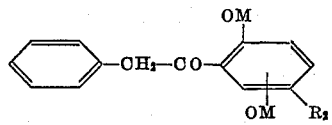

in which M represents an alkaline metal and $R_2$ has the aforementioned signification, the second group OM being in a position selected from the positions consisting of 4 and 6, a halogenated tertiary base of the formula:

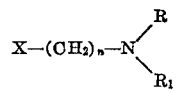

in which X is a halogen and $n$, R and $R_1$ have the aforementioned significations.

9. Process as claimed in claim 8, wherein the reaction is effected by heating in a water bath, the reactants being dissolved in a solvent.

10. Process as claimed in claim 9, wherein said solvent is alcohol.

11. Process as claimed in claim 8, wherein said alkaline derivative is prepared in situ.

12. Process of preparing new derivative of desoxybenzoins selected from the group consisting of the compounds having the general formula:

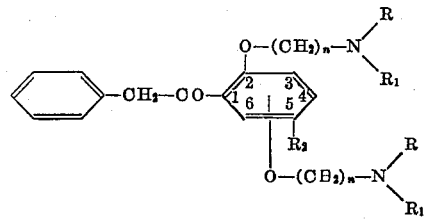

and the acid addition salts thereof, in which formula $R_2$ is a radical selected from the group consisting of hydrogen and alkyl radicals of from 1 to 6 carbon atoms, R and $R_1$ are each a lower alkyl radical of from 1 to 4 carbon atoms, $n$ is a whole integer of from 1 to 3, and the second substituent

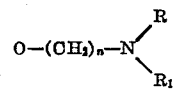

is in a position selected from the positions consisting of 4 and 6, said process comprising heating in a solvent at the boiling temperature of said solvent an alkaline derivative of a hydroxydesoxybenzoin of formula:

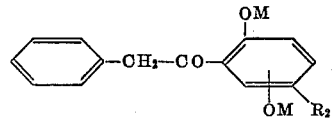

in which M represents an alkaline metal and $R_2$ has the aforementioned signification, the second group OM being in a position selected from the positions consisting of 4 and 6, and a halogenated tertiary base of the formula:

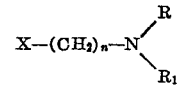

in which X is a halogen, and $n$, R and $R_1$ have the aforementioned significations, thereafter acidifying the reactional mixture so as to form the amine salt, evaporating the solvent, collecting said salt and contingently alkalizing the latter to obtain the free amine.

References Cited in the file of this patent

UNITED STATES PATENTS 2,668,850  Goldberg et al. _____ Feb. 4, 1954